Feb. 8, 1949.                H. L. PELZER                 2,461,172
                  PYROLYTIC CONVERSION OF HYDROCARBONS
                         Filed June 11, 1947
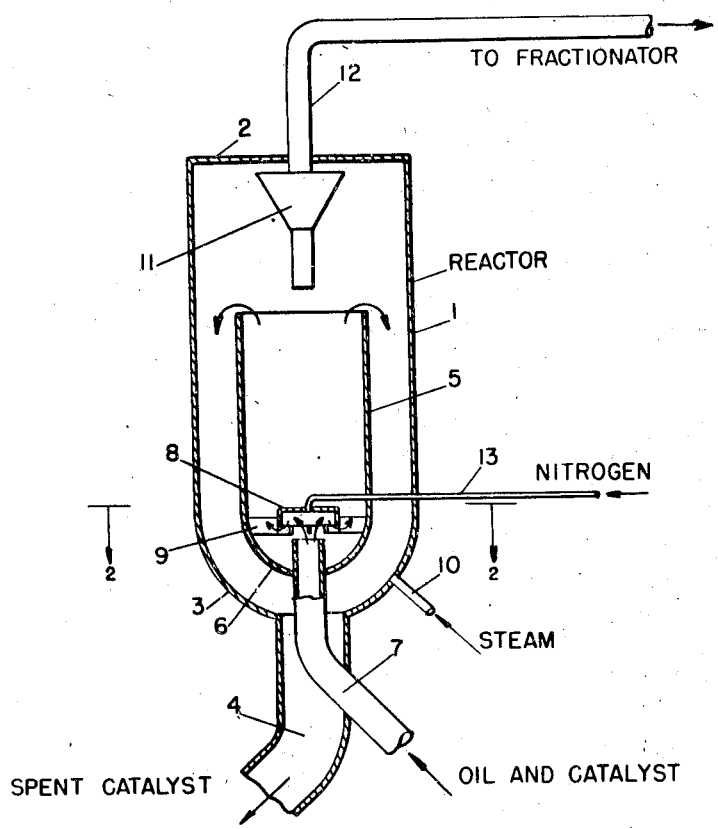
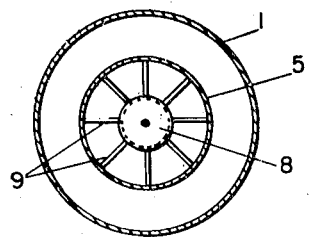
INVENTOR.
HARRY LOUIS PELZER
BY
Pennie, Edmonds, Morton & Barrows
ATTORNEYS Patented Feb. 8, 1949

2,461,172

UNITED STATES PATENT OFFICE 2,461,172

PYROLYTIC CONVERSION OF HYDROCARBONS

Harry Louis Pelzer, Steger, Ill., assignor to Sinclair Refining Company, New York, N. Y., a corporation of Maine Application June 11, 1947, Serial No. 754,018

6 Claims. (Cl. 196—52)

This invention relates to the pyrolytic conversion of hydrocarbons and, more particularly, to pyrolytic conversion processes involving the use of a finely divided solid catalyst.

The invention is especially applicable to conversion processes of the general type wherein a finely divided catalyst at elevated temperature is suspended in the charge oil passing to a reactor in which conversion of the oil occurs and in which the spent catalyst is separated from the oil vapors, the separated catalyst stripped of oil, regenerated by decarbonizing the catalyst and the regenerated catalyst again suspended in the stream of charge oil passing to the reactor. Operations of the type described are commonly designated fluid catalyst processes.

In conventional fluid catalyst operations as described, the spent catalyst is passed to the reaction zone in suspension in the charge oil, usually in the vapor phase, and is maintained in a fluidized state in the reactor in contact with the oil vapors during the conversion of the latter.

In order to obtain the maximum yield of the desired reaction product by the use of a given proportion of the catalyst, maximum uniformity of dispersion of the catalyst in the oil vapors passing through the reactor is essential. In conventional practice, the finely divided catalyst entering the reactor is frequently not uniformly dispersed in the oil but is suspended therein in the form of agglomerates, or clusters, of the fine catalyst particles. Under such conditions, maximum and uniform contact between the hydrocarbon vapors and the catalyst is not attained in the reaction zone, with the result of lower efficiency of the desired conversion reaction. More uniform contact between the catalyst and oil vapors in the reactor is promoted if the catalyst is more uniformly dispersed in the entering charge oil.

The present invention provides improvements in conversion operations of the fluid catalyst type whereby a more thorough and more uniform contact of the catalyst with the oil vapors in the reaction zone is assured. The invention further provides improved apparatus especially adapted to the carrying out of the process.

According to my present invention, the suspension of catalyst in hydrocarbon vapors to be converted, for instance, a suspension of freshly regenerated catalyst, is passed at high velocity upwardly into the lower end of the reaction chamber and, there, the velocity of the stream is suddenly broken by impact with the underside of an inverted substantially circular cap, placed directly in the path of the incoming vapors, which results in the downward deflection of the stream of suspended catalyst and vapors. I then reduce the turbulence of the downwardly deflected currents and effect their even radial distribution by passing the suspension radially through straightening vanes. From the straightening vanes, the streams of suspension pass upwardly through the reaction chamber.

By using a generally cylindrical reaction chamber and injecting the suspension at a centrally positioned point in the lower end of the chamber, a thorough mixing of the catalyst in oil vapors and a uniform density of the catalyst over the entire cross-section of the catalyst bed are obtained.

The invention will be further described and illustrated by reference to the accompanying drawing, which represents conventionally and somewhat diagrammatically a particularly advantageous embodiment of my invention and of which—

Figure 1 is a vertical sectional view of the apparatus; and

Figure 2 is a horizontal sectional view along the lines 2—2 of Figure 1.

The apparatus indicated by the reference numeral 1 of the accompanying drawing represents a generally cylindrical vertically elongated reaction chamber, closed at its upper end by cover plate 2 and having a dished bottom, as indicated at 3, which terminates in conduit 4. Coaxially positioned within the chamber 1 is a smaller chamber 5, open at its upper end and closed at its lower end by the dished bottom 6.

The conduit 7 passes upwardly into the lower portion of chamber 5, the inner end of the conduit being vertical and coaxially positioned within the chamber 5. Just above the exit of conduit 7 there is an inverted cap 8 of heavy metal which acts as a target and deflector of the suspension introduced into the chamber through conduit 7. Vertically positioned straightening vanes 9 extend radially between the downwardly projecting edges of the cap 8 and the walls of the chamber 5, these vanes extending vertically from a point near the upper end of the cap to a point somewhat below the downwardly projecting edges of the cap, as more clearly appears from Figure 1 of the drawing.

In operation, the suspension of catalyst in hydrocarbon vapors to be converted is passed to the reactor through conduit 7 at high velocity and impinges upon the underside of the cap 8, being thereby deflected downwardly and outwardly between the radially extended straightening vanes 9, whereby the suspension is distributed uniformly throughout the cross-sectional area of chamber 5.

As the suspension passes upwardly through chamber 5, there is a tendency for the catalyst to drop out of suspension, thus forming a relatively dense phase body of fluidized catalyst in the chamber. As this catalyst accumulates in chamber 5, it overflows from the upper end thereof into the annular space surrounding chamber 5 and gravitates downwardly therethrough to the lower end of chamber 1 from which it flows through conduit 4 to a stripping or regenerating zone.

The stripping of readily vaporizable hydrocarbons from the catalyst may, with advantage, be effected as the catalyst gravitates downwardly through the annular space by passing a gaseous stripping medium, steam, for instance, into the lower end of chamber 1 through line 10 and causing it to pass upwardly through the downwardly flowing catalyst bed. The stripping medium may be introduced by means of a bustle pipe, or other conventional means, adapted to effect even distribution of the stripping medium through the downwardly flowing body of catalyst.

Hydrocarbon vapors, products of the conversion, and stripping medium, where used, are withdrawn from the upper end of chamber 1 through a separator, diagrammatically indicated at 11, for the separation of suspended catalyst, and pass from thence through conduit 12 to fractionating apparatus, not shown in the drawing.

In order to avoid serious abrasion of the cap 9 by the incoming suspension, nitrogen, or other inert gaseous medium, is, with advantage, passed through line 13 into the upper portion of the cap. The nitrogen thus injected forms a cushion between the cap and the incoming suspension and minimizes abrasion of the cap.

The catalyst employed may be of the type conventionally used in fluid catalyst processes, for instance, a silica-alumina type catalyst in finely divided or powdered form. The reaction conditions may, likewise, be those conventionally used in operations of this type and, as understood by the art, the optimum temperatures and pressures will depend primarily upon the type of feed stock used, the particular catalyst employed and the reaction desired.

The invention contemplates the use of known methods and means for regenerating the catalyst and for stripping and conveying the catalyst through the system. In cracking gas oil, for instance, the reaction temperature may, with advantage, be within the range of 800° to 1,000° F. and the pressure at the top of the reactor within the range of 5 to 25 pounds per square inch. The temperature of the catalyst undergoing regeneration may, with advantage, be maintained within the range of 950° to 1,200° F., temperatures above this range being avoided by known means.

It will be understood that the invention is not restricted with respect to the particular type of fluid catalyst conversion processes but is applicable to various modifications of fluid catalyst processes in which the catalyst in finely divided form is brought into intimate contact with the hydrocarbon vapors in a reaction zone maintained at conversion temperatures.

I claim:

1. In the fluid catalyst process for the conversion of hydrocarbons wherein a finely divided catalyst at an elevated temperature is brought into contact with hydrocarbon vapors to be converted in a conversion chamber, the step of injecting a suspension of the catalyst in the hydrocarbon vapors, as a substantial vertical, high velocity stream, into the lower end of a vertically elongated, cylindrical conversion chamber, suddenly breaking the velocity of the stream and deflecting the stream downwardly and radially outwardly, reducing the turbulence of the radially directed stream, distributing it substantially uniform and passing the suspension upwardly through the conversion chamber.

2. In the fluid catalyst process for the conversion of hydrocarbons wherein a finely divided catalyst at an elevated temperature is brought into contact with hydrocarbon vapors to be converted in a conversion chamber, the step of injecting a suspension of the catalyst in the hydrocarbon vapors, as a substantial vertical, high velocity stream, into the lower end of a vertically elongated, cylindrical conversion chamber, suddenly breaking the velocity of the stream and deflecting the stream downwardly and radially outwardly, reducing the turbulence of the radially directed stream, distributing it substantially uniformly and passing the suspension upwardly through the conversion chamber, disengaging the hydrocarbon vapors from the catalyst and separately withdrawing the hydrocarbon vapors and catalyst from the conversion chamber.

3. In the fluid catalyst process for the conversion of hydrocarbons wherein a finely divided catalyst at an elevated temperature is brought into contact with hydrocarbon vapors to be converted in a conversion chamber, the step of injecting a suspension of the catalyst in the hydrocarbon vapors, as a substantial vertical, high velocity stream, into the lower end of a vertically elongated, cylindrical conversion chamber, suddenly breaking the velocity of the stream and deflecting the stream downwardly and radially outwardly, reducing the turbulence of the radially directed stream, distributing it substantially uniformly and passing the suspension upwardly through the conversion chamber, disengaging the hydrocarbon vapors from the catalyst, passing the catalyst downwardly through an annular zone surrounding the conversion chamber in contact with a rising current of a gaseous stripping medium, withdrawing the hydrocarbon vapors and stripping medium from the upper end of the conversion chamber and withdrawing catalyst from the lower end of the annular chamber.

4. In the fluid catalyst process for the conversion of hydrocarbons wherein a finely divided catalyst at an elevated temperature is brought into contact with hydrocarbon vapors to be converted in a conversion chamber, the step of injecting a suspension of the catalyst in the hydrocarbon vapors, as a substantially vertical, high velocity stream, into the lower end of the conversion chamber, directing the stream at high velocity against a substantially horizontal metal plate, whereby the stream is deflected downwardly and radially outwardly and protecting the plate from abrasion by injecting a substantially inert cushioning gas into the zone directly beneath the lower surface of the plate.

5. Apparatus of the type described comprising a closed, vertically elongated chamber, a second vertically elongated chamber coaxially positioned in the first chamber and in open communication therewith at its upper end, a conduit entering the lower end of the inner chamber and terminating therein, the inner end of the conduit being directed substantially vertically and coaxially positioned with respect to the chambers, a substantially circular cap having downwardly projecting edges placed directly above the inner end of said conduit, straightening vanes extending radially from the sides of the cap to the inner walls of the inner chamber, and conduit means leading from the lower end and upper end, respectively, of the outer chamber.

6. Apparatus of the type described comprising a closed, vertically elongated chamber, a second vertically elongated chamber coaxially positioned in the first chamber and in open communication therewith at its upper end, a conduit entering the lower end of the inner chamber and terminating therein, the inner end of the conduit being directed substantially vertically and coaxially positioned with respect to the chambers, a substantially circular cap having downwardly projecting edges placed directly above the inner end of said conduit, straightening vanes extending radially from the sides of the cap to the inner walls of the inner chamber, conduit means leading from the lower end and upper end, respectively, of the outer chamber, and a connection adapted to inject a gaseous medium into the zone directly beneath the lower surface of the cap.

HARRY LOUIS PELZER.

REFERENCES CITED

The following references are of record in the file of this patent:

UNITED STATES PATENTS

| Number | Name | Date |
|---|---|---|
| 1,614,770 | Ayling | Jan. 18, 1927 |
| 2,337,684 | Scheineman | Dec. 28, 1943 |
| 2,376,190 | Roetheli | May 15, 1945 |
| 2,412,152 | Huff | Dec. 3, 1946 |
| 2,415,755 | Ogorzaly et al. | Feb. 11, 1947 |

FOREIGN PATENTS

| Number | Country | Date |
|---|---|---|
| 466,191 | Great Britain | May 24, 1937 |